United States Patent [19]
Tarvin et al.

[11] Patent Number: 5,145,377
[45] Date of Patent: Sep. 8, 1992

[54] COLOR-CODED TRAINING METHOD

[75] Inventors: Diana J. Tarvin, Bloomington; Ronald E. Goerne, Normal, both of Ill.

[73] Assignee: 1-2-3 Training Systems, Ltd., Bloomington, Ill.

[21] Appl. No.: 594,726

[22] Filed: Oct. 9, 1990

[51] Int. Cl.$^5$ ............................................ G09B 19/00
[52] U.S. Cl. .................................... 434/219; 434/170
[58] Field of Search ................. 434/184, 207, 382, 94, 434/156, 157, 112, 259, 170, 233, 365, 219, 227; 273/296, 302, 308; 132/202, 208, 200

[56] References Cited

U.S. PATENT DOCUMENTS

| | | |
|---|---|---|
| 683,267 | 9/1901 | Froehlich . |
| 1,342,520 | 6/1920 | Wright ................................. 273/296 |
| 3,389,480 | 6/1968 | Holland . |
| 3,482,333 | 12/1969 | Trager, Jr. . |
| 3,823,492 | 7/1974 | Allain . |
| 4,270,284 | 6/1981 | Skellings . |
| 4,345,902 | 8/1982 | Hengel . |
| 4,419,081 | 12/1983 | Steinmann . |
| 4,472,146 | 9/1984 | Weissbrod ........................... 434/365 |
| 4,533,328 | 8/1985 | McDaniel ............................. 434/94 |
| 4,643,680 | 2/1987 | Hill . |
| 5,018,976 | 5/1991 | Kuyath ................................ 434/207 |

OTHER PUBLICATIONS

Shami, Farouk, "Sunglitz: New Method Of Lightening And Permanently Brightening Hair With The Use Of Non-Oxidizing Pigments", 1988; pp. 8, 9, 12 and 13.
"Kitchen Clean Scene", Surflex Series Brochure and accompanying literature, Anderson Chemical Company, Litchfield, Minnesota 55355, 15 pages, distributed at the Atlanta ISSA '90 Trade Show, Oct. 18, 1990.

Primary Examiner—Richard J. Apley
Assistant Examiner—Karen Richard
Attorney, Agent, or Firm—Welsh & Katz

[57] ABSTRACT

A color-coded system of training illiterate, mentally handicapped or dyslexic individuals in the performance of certain tasks includes specifying colors designating particular objects and the task or operation to be performed with the object bearing a particular color. Color-coded visual indicators such as flash cards may be used to teach the individual to associate the color with the object and the operation.

13 Claims, 2 Drawing Sheets

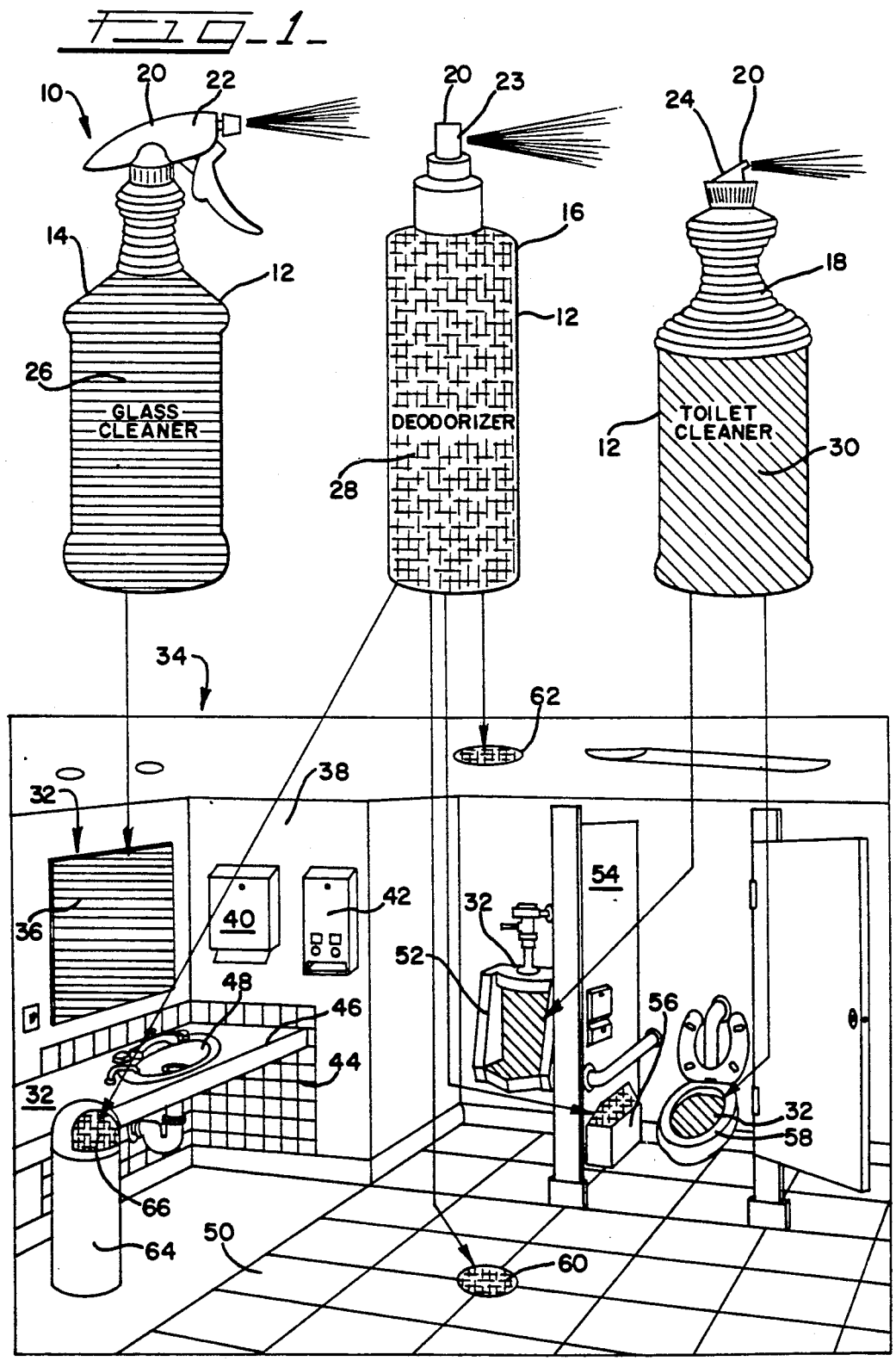

FIG-2-
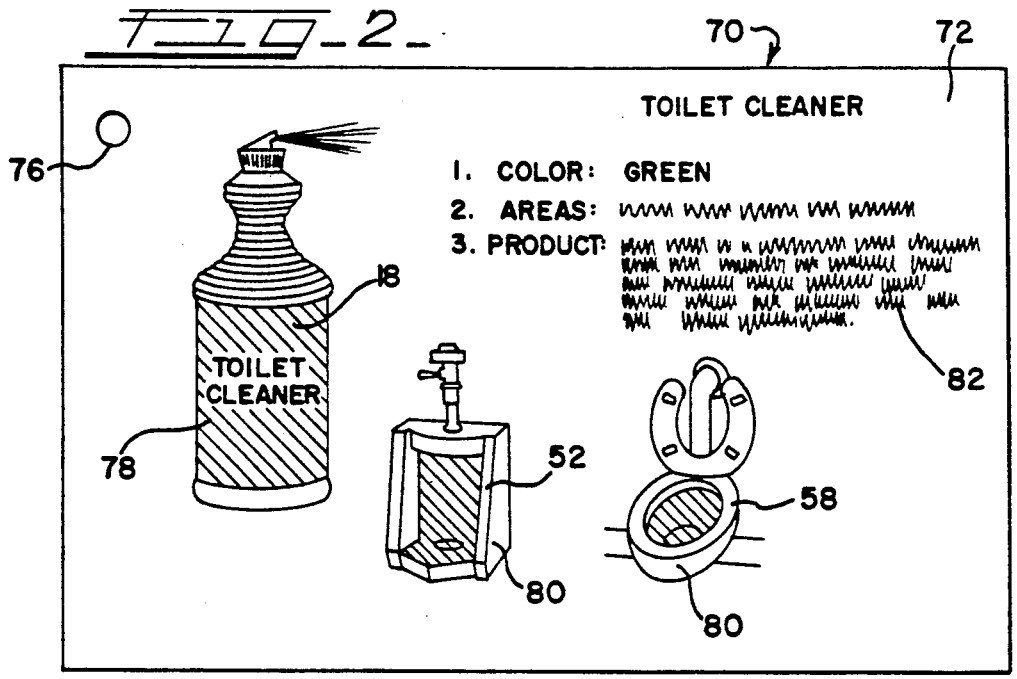
FIG-3-
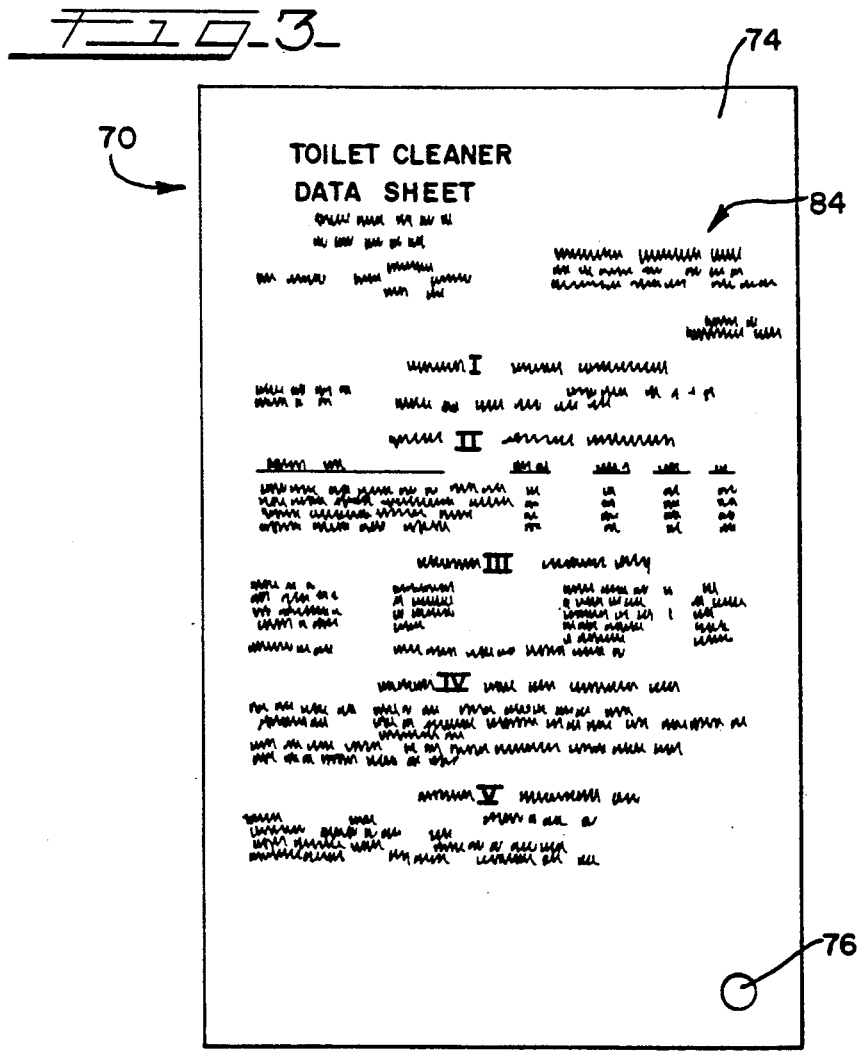

COLOR-CODED TRAINING METHOD

BACKGROUND OF THE INVENTION

The present invention relates to methods of vocational training, and specifically to a method for training individuals who are illiterate, mentally handicapped or dyslexic, or who do not speak or read a specified language.

In the industrialized world, current labor force demographics are such that jobs requiring little or no skill are increasingly filled by individuals with minimal educational background, or alternately, by recent immigrants with negligible ability to read and/or speak the home country's language. In addition, there is an increasing awareness on the part of businesses as to the capabilities of mentally handicapped and dyslexic individuals to perform relatively simple jobs.

Consequently, as more illiterate, immigrant and/or mentally handicapped individuals are hired, businesses must increasingly address the problem of training such workers to be efficient and productive members of the organization. Aside from training such workers in the basic skills of a particular job, a significant consideration in any such training program is that of safety—the employee should be trained so as not to be a safety hazard to himself or to his co-workers.

Accordingly, in order to properly train these types of workers, training personnel must often have skills in more than one language, and this requirement may also lead to difficulties in obtaining adequate training staff. These sorts of labor problems are prevalent in industries such as janitorial services, food service and factory assembly workers, to name a few.

In the janitorial field, it is important that employees understand the proper application for a variety of cleaning products. For example, certain chemical cleaners are suitable for cleaning toilet bowls and shower stalls, but are quite unsuitable for mirrors or polished metal surfaces. It has often been difficult to convey these concepts to the kinds of workers identified above.

Thus, there is a need for a method of training unskilled, handicapped, dyslexic, and/or illiterate employees to work efficiently and safely without requiring the substantial expenditures for training overhead.

SUMMARY OF THE INVENTION

Accordingly, the present method of training employs a color-coded system in which specific colors are used to designate particular objects, as well as the task or operation to be performed with each object, and/or the surface upon which the operation is to be performed. Color-coded visual indicators such as flash cards may be used to teach the individual to associate the color with the object and the operation or surface, and to remind the individual of such association during the performance of tasks.

More specifically, in the case of a janitorial application, each one of a plurality of chemical cleaning agents used to clean certain surfaces is formulated in a specific color or is packaged in a colored container. A visual indicator, such as a set of flash cards, is provided in which the agent would be depicted in its packaging and in color. Also indicated on the flash card is a diagrammatic representation of the surfaces to be cleaned by the agent, with the surfaces being depicted in the same color as the cleaning agent. The worker carries the set of flash cards with him for easy reference while working and to reinforce his training and insure the use of the proper agent for a particular surface. The cards may be arranged in the set in a particular order corresponding to the specific order of tasks to be performed in a succession. Although each card may contain written information about the cleaning agent and its application, the principal features of the card are the colored diagrammatic representations of the cleaning agent and the surfaces to be cleaned so that illiterate, dyslexic, or mentally handicapped individuals may readily understand the proper cleaning procedure.

BRIEF DESCRIPTION OF THE DRAWINGS

FIG. 1 is a diagrammatic view of the present system showing a plurality of color-coded cleaning agents and a representation of the surfaces to be cleaned by those agents, the surfaces also being color-coded;

FIG. 2 is a diagrammatic view of a front side of a flash card designed for use in the present system; and FIG. 3 is a diagrammatic view of a rear side of the flash card depicted in FIG. 2.

DESCRIPTION OF THE PREFERRED EMBODIMENT

Referring now to FIG. 1, the system of the invention is generally designated 10 and includes a plurality of objects 12, which are depicted as dispensing containers for cleaning liquids and are respectively designated 14, 16 and 18, although the use of articles needed for other jobs, such as tools, brooms, shovels, etc., as well as additional numbers of objects 12 is also contemplated. Each of the containers 14, 16 and 18 is provided with a dispensing attachment 20 such as a spray head 22, a mister 23 or a squirt head 24. The use of other types of conventional dispensing attachments such as aerosols are contemplated according to the dictates of the particular cleaning chemical.

In the preferred embodiment, each container 14, 16, 18 is made of a translucent or transparent plastic through which the color of the corresponding cleaning liquid may be seen. The container 14 contains a liquid 26 used for cleaning glass. The liquid 26 is provided or formulated in a specific color, which in the illustrated embodiment is shown in cross-hatching indicating blue, although any other color may be employed. The container 16 contains a liquid 28 which is an odor counteractant. The liquid 28 is provided or formulated in a specific color, which in the illustrated embodiment is shown in cross-hatching indicating yellow or gold, although any other color may be employed.

Lastly, the container 18 is filled with a liquid 30 for cleaning inside toilet bowls and urinals. The liquid 30 is provided or formulated in a specific color, which in the illustrated embodiment is shown in cross-hatching indicating green, although any other color may be employed. Due to the thicker consistency of the liquid 30, it is provided in the container 18 having a squirt-type head 24.

The above-identified types of chemicals 26, 28, 30 are used for purposes of example only, and it should be understood that other types of chemicals used for other types of cleaning operations may also be used and designated by specific colors. It is also contemplated that, depending on the nature of the chemical and the possibility of a reaction with the container and/or light, that the containers 14, 16, or 18 may be made of opaque material having the designated color or a colored label.

In the case of an opaque container, the corresponding liquid may not necessarily be formulated in that same color, or, for that matter, in any color at all.

The system 10 also includes the designation of operations 32 upon which tasks using the objects 12 may be performed, with each task represented by the same color as the corresponding object. In FIG. 1, a diagrammatic view 34 of a typical rest room is depicted in which certain cleaning chemicals are used. The rest room 34 includes diagrammatic representations of all of the surfaces which will need cleaning by the specific chemicals 26, 28, 30. Thus, the rest room 34 will include a mirror 36, at least one wall 38, a paper towel dispenser 40, a novelty dispenser 42, a tiled surface 44, a counter top 46, a sink 48, a floor 50, a urinal 52, a partition 54, sanitary napkin receptacle 56, a toilet bowl 58, a drain 60, an air vent 62, and/or a waste receptacle 64 with a lid 66.

In the present system 10, the surfaces to be cleaned by the respective chemicals, 26, 28, 30 are designated by like colors. The mirror 36 is colored blue to match the color of the chemical 26. The sanitary napkin receptacle 56, the drain 60, the air vent 62 and the waste receptacle lid 66 are all colored yellow or gold to match the color of the chemical 28. The inside of the urinal 52 and the toilet bowl 58 are colored green to match the color of the chemical 30. It is contemplated that the illustration of the rest room 34 may be provided in label form upon each of the bottles 14, 16 and 18.

When the system 10 of the invention is used to train janitorial personnel, the color designations of the chemicals 26, 28, 30 and of the corresponding surfaces 36, 56, 60, 62, 66, 52 and 58 as are depicted in FIG. 1 are presented to the employees in a training program in some sort of visual form, such as a set of flash cards, a workbook, poster, video recording, overhead projection, etc., or a combination of the above, to enable the employees to make the association between each chemical and its intended operation or use. Preferably, the training may be organized in a classroom situation, complete with lectures and quizzes.

Referring now to FIGS. 2 and 3, once the initial training is complete and the employees have been instructed to associate the particular chemicals 26, 28 and 30 with the corresponding surfaces 36, 56, 60, 62, 66, 52 and 58 to be cleaned, each employee is provided with a set of flash cards 70 which are configured to be carried on the employee's person or upon a cleaning cart (not shown). Each flash card 70 is fabricated of durable, water-resistant paper or plastic and includes a front surface 72 (FIG. 2), a rear surface 74 (best seen in FIG. 3), and an eyelet 76 for attachment to a key ring (not shown) or the like for easy on-the-job access. The cards 70 may be arranged in the order in which the respective tasks or operations are to be performed.

On the front surface 72, the flash card 70 preferably includes a colored representation 78 of one of the containers 14, 16, 18, the container 18 being illustrated as an example. Also depicted on the front surface 72 is a colored representation 80 of the surface to be cleaned, in this example, the inside surfaces of the urinal 52 and the toilet bowl 58 being illustrated. Alternatively, a reduced version of the entire rest room 34 may be included on the front surface 72 as is shown in FIG. 1. If desired, printed information 82 regarding the name of the chemical, its uses, and/or general information as to its makeup may also be included on the front surface 72.

Referring now to FIG. 3, the rear surface 74 preferably includes printed information 84 of the sort contained on a Material Safety Data Sheet (MSDS), listing General Information, Hazardous Ingredients, Physical Data, Fire and Explosion Data, Reactivity Data, and Emergency Contact telephone numbers and addresses. Even though the maintenance worker may not be able to read or understand the MSDS information, the easy access to such information may prove to be invaluable to a supervisor or to emergency personnel should an accident occur.

Thus, the present system 10 may be used in a training method wherein illiterate, mentally handicapped and/or dyslexic workers may be instructed in the performance of specified tasks with specific objects or tools upon specified surfaces without excessive verbal and/or written instructions. The workers are instructed to identify or associate the color of the object with the task to be performed by that object. Also, the training may be continuously reinforced and the worker may be reminded, through the use of the set of cards during the performance of tasks, of each task to be performed, the order of performance of the tasks, the objects and tools to be used in each task, and the color associated with that particular object and task. Although the present method has been illustrated and described in relation to liquid cleaning chemicals used in a janitorial application, skilled practitioners will appreciate that it may be employed in other situations where such workers need to be trained in relatively simple tasks.

While a particular embodiment of the present color-coded training method has been shown and described, it will be appreciated by those skilled in the art that changes and modifications may be made thereto without departing from the invention in its broader aspects and as set forth in the following claims.

What is claimed is:

1. A method of training an individual in the use of several objects, each such object being used in the performance of at least one of a plurality of distinct operations, comprising:

identifying each of said distinct operations with a different one of a plurality of different colors;

designating each of said objects used in performing a respective one of said operations with the one of said colors which identifies said operation; and providing associating means for visually associating each of said colors with each of said corresponding operations and each of said corresponding objects, so that an individual may associate a particular one of said colors with a particular one of said objects, as well as with a corresponding one of said operations to learn the proper object for performing a designated operation, as well as the physical location in which said operations are to be performed.

2. The method of claim 1 wherein said objects are chemical cleaning products and said operations are cleaning tasks.

3. The method of claim 1 wherein said associating means is a set of flash cards.

4. The method of claim 3 wherein each of said flash cards bears one of said colors, and includes a representation of one of said objects as well as a representation of said corresponding operation.

5. The method of claim 4 wherein said representations of said object and said operation are color-coded with the same color.

6. The method of claim 3 wherein at least one of said flash cards further includes a representation of the environment in which said corresponding operation is performed.

7. The method of claim 3 wherein at least one of said flash cards includes printed information regarding said operation and said object.

8. The method of claim 3 wherein said flash cards are arranged in the order in which the operations are to be performed.

9. A method of training an individual in the use of several different cleaning products, each such product designed for cleaning at least one of a plurality of surfaces, comprising:
- identifying each of the products with a different one of a plurality of different colors;
- designating each surface upon which said product is used with the one of said colors which identifies said product; and
- providing associating means for associating each of said colors with each of said corresponding products and with each of said corresponding surfaces.

10. The method of claim 9 wherein said associating means is a set of flash cards.

11. The method of claim 10 wherein each of said flash cards bears one of said colors, and includes color-coded representations of said corresponding product as well as said surfaces upon which said cleaning operation is to be performed.

12. The method of claim 10 wherein at least one of said flash cards includes printed information regarding said product.

13. A method of training an individual in the use of several objects, each such object being used in the performance of at least one of a plurality of operations, comprising:
- identifying each of said operations with a different one of a plurality of different colors;
- designating each of said objects used in performing a respective one of said operations with the one of said colors which identifies said operation;
- providing associating means for visually associating each of said colors with each of said corresponding operations and each of said corresponding objects;
- wherein said associating means is a set of flash cards arranged in the order in which the operations are to be performed.

* * * * *